Dec. 13, 1932.　　　　F. F. RAVLIN　　　1,891,180
COMBINATION SUPPORT FOR SERVING TRAYS FOR USE ON AUTOMOBILES
Filed July 15, 1932
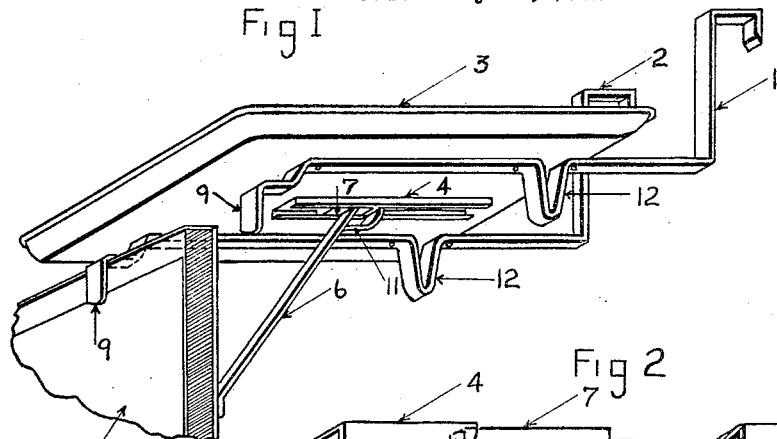
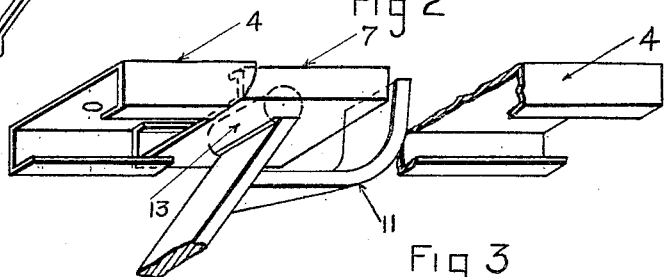
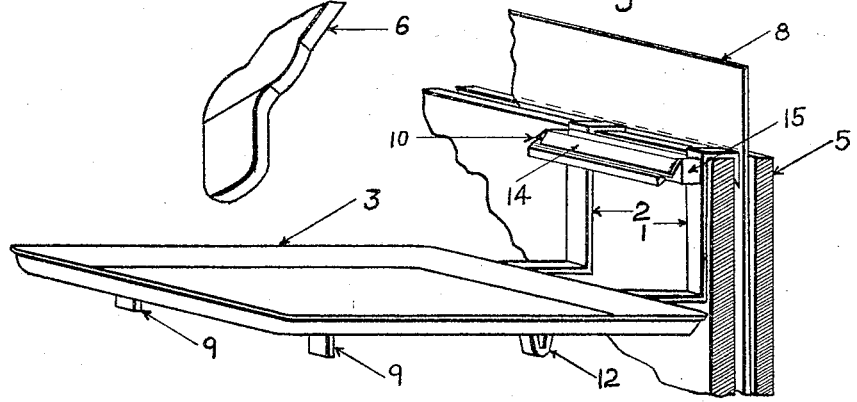
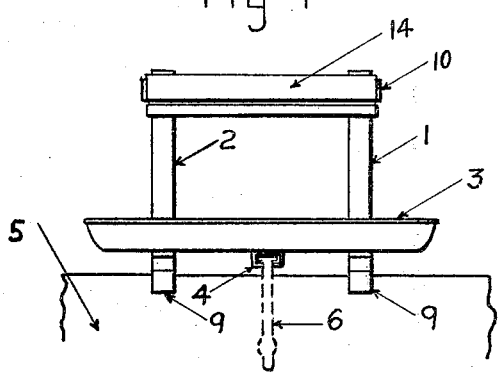
Inventor
Frederick F. Ravlin Patented Dec. 13, 1932

1,891,180

UNITED STATES PATENT OFFICE

FREDERICK F. RAVLIN, OF SOUTH MIAMI, FLORIDA

COMBINATION SUPPORT FOR SERVING TRAYS FOR USE ON AUTOMOBILES

Application filed July 15, 1932. Serial No. 622,581.

The object of my invention is to provide a combination support for serving trays that can be used inside of an automobile and held at the proper height to serve as a table, to allow the window to be closed with the tray in position if desired, also to hang on the outside of the window or door if the door construction prevents its use inside. At present the trays now in use are set on the window sill and are too high to serve as a table and it is not possible to close the window in case of cold or stormy weather. With my supporting device the window can be closed with the tray inside of the car and long hooks allow the tray to hang down low enough to allow a person to use the tray as a table comfortably.

In the accompanying drawing:—

Figure 1 is a broken perspective view of the trays supported from outside an automobile door.

Figure 2 is a broken perspective of the securing means for the tray.

Figure 3 is a broken perspective view showing the tray support on the inside of an automobile door.

Figure 4 is an elevation of the arrangement shown in Figure 1.

Figure 1 shows the tray 3, hanging on the outside of an automobile door or window 5, and supported by a movable brace 6, and two legs 9, to hook over the inside of the door 5, 4 showing the channeled member in which the guide 7 moves and carries the upper enlarged end of brace 6.

When this brace 6 is moved forward against the side of the car, the lever 11 is pressed back against the floor of the channeled member 4, also causing the guide 7 to bind in the lower edges of channeled member 4, causing the brace 6 to be locked in position to support the outer end of the tray.

When it is desired to remove the tray, the outer end of the tray is raised slightly and the brace 6 pulled back far enough for the brace to be moved upward and drawn into the channeled member 4, thereby keeping it locked in position so that the tray can be set down on the legs 9 and 12.

Figure 2 is an enlarged view of the channeled member 4, brace 6, lever 11 with enlarged end 13 hanging through slot in guide 7.

Figure 3 shows the tray hanging inside the car at the proper height to serve as a table.

The hooks 1 and 2, which are extensions of the metal strips forming feet 9 and 12, are arranged so that they can be set over the window sill of door 5 and inside of glass 8 thus allowing the window to be closed, if desired. 15 is a box-like structure to hold salt, pepper and mustard bottles. 14 is a rack made by bending the front side of condiment holder 15 forward forming a shelf on which to place napkins, this whole structure also acting as a brace on hooks 1 and 2.

Figure 4 shows an end view of the tray, from inside of car, resting on the top of car door 5; 14 shows the napkin rack in front of the condiment holder 15, and the swinging bar 10 to hold the napkins in place on the holder.

Having thus described my invention, what I claim as new and original and for which I desire to secure Letters Patent is,

1. In combination, a tray, frame bars secured to the tray and extending upwardly therefrom, said bars having terminal hooks to engage an automobile door window pocket, and a brace connecting said bars above the tray and formed as a receptacle.

2. In combination, a tray, frame bars secured to the tray and extending upwardly therefrom, said bars having terminal hooks to engage an automobile door window pocket, a brace connecting said bars above the tray and formed as a receptacle, and a shelf carried by said receptacle.

In testimony whereof I hereunto set my hand.

FREDERICK F. RAVLIN.